(12) United States Patent
Bluhm

(10) Patent No.: US 6,363,732 B1
(45) Date of Patent: Apr. 2, 2002

(54) ADDITIONAL HEATING SYSTEM FOR A MOTOR VEHICLE

(75) Inventor: Klaus-Jürgen Bluhm, Steinbach (DE)

(73) Assignee: Mannesmann VDO AG (DE)

( * ) Notice: Subject to any disclaimer, the term of this patent is extended or adjusted under 35 U.S.C. 154(b) by 0 days.

(21) Appl. No.: 09/660,650

(22) Filed: Sep. 13, 2000

(30) Foreign Application Priority Data

Sep. 15, 1999 (DE) .......................................... 199 44 101
Aug. 16, 2000 (DE) .......................................... 100 40 637

(51) Int. Cl.[7] .......................... F25B 41/00; F25B 31/00; F25D 23/12
(52) U.S. Cl. ........................ 62/196.4; 62/505; 62/259.2
(58) Field of Search ................................ 62/259.2, 505, 62/196.4, 324.1, 324.6

(56) References Cited

U.S. PATENT DOCUMENTS

| | | | | |
|---|---|---|---|---|
| 3,945,219 A | * | 3/1976 | Kasahara | 62/469 |
| 5,226,294 A | * | 7/1993 | Mayer | 62/323.1 |
| 5,549,153 A | * | 8/1996 | Baruschke et al. | 165/42 |
| 5,682,757 A | * | 11/1997 | Peterson | 62/259.2 |
| 5,878,589 A | * | 3/1999 | Tanaka et al. | 62/199 |
| 6,041,849 A | * | 3/2000 | Karl | 165/42 |
| 6,116,040 A | * | 9/2000 | Stark | 62/259.2 |
| 6,234,768 B1 | * | 5/2001 | Harakawa et al. | 417/366 |

* cited by examiner

Primary Examiner—William Doerrler
(74) Attorney, Agent, or Firm—Mayer, Brown & Platt

(57) ABSTRACT

The invention relates to a device for implementing an additional heating system for a motor vehicle, having a heating/air-conditioning unit of a motor vehicle, which has a compressor that is driven by an electric motor and is arranged in a compression-type refrigerating circuit. In order to achieve additional heating of the motor vehicle in a simple manner while nevertheless obtaining the possibility of heating the motor vehicle rapidly and reliably, the electric motor (17) and/or at least the power components (30) of engine electronics (29) controlling the electric motor (17) are arranged in such a way that the waste heat of the electric motor (17) and/or the power components (30) is dissipated by a refrigerant or a heating agent of the heating/air-conditioning unit (1), which releases the heat absorbed to the interior of the vehicle.

17 Claims, 5 Drawing Sheets a)
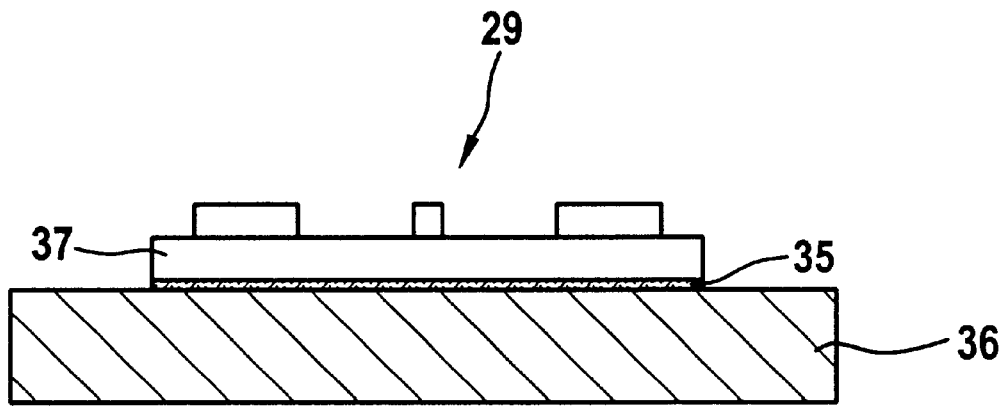
Fig. 5
b)
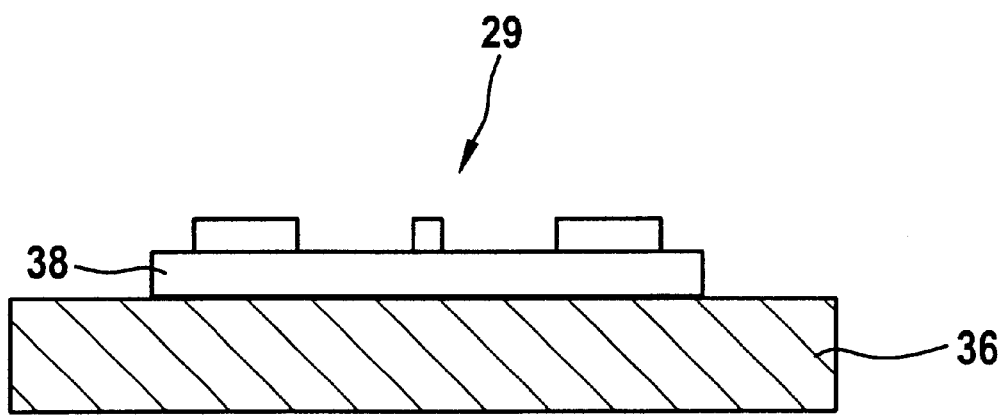

ADDITIONAL HEATING SYSTEM FOR A MOTOR VEHICLE

BACKGROUND OF THE INVENTION

1. Field of the Invention

The invention relates to an additional heating system for a motor vehicle.

2. Background of the Invention

It is known that heating systems can be implemented in motor vehicles by using the heat released by the internal combustion engine. However, the new generation of direct-injection internal combustion engines is significantly more efficient, with the result that the amount of heat produced by these engines is no longer sufficient to heat the interior comfortably in all operating states. Particularly after a cold start, the very long time that elapses before the internal combustion engine produces a sufficient heat output is troublesome.

It is furthermore known that additional heating systems can be implemented by connecting up electric heating elements, such as heating bars.

SUMMARY OF THE INVENTION

The underlying object of the invention is therefore to specify an additional heating system for a motor vehicle that can be implemented in a simple manner and nevertheless allows the motor vehicle to be heated up rapidly and reliably.

According to the invention, the object is achieved by virtue of the fact that a heating/air-conditioning unit of the motor vehicle has a compressor, which is driven by an electric motor and is arranged in a refrigerating circuit carrying a refrigerant, the compressor having a switching device for switching from the refrigerating circuit to a heating bypass and back again, the heating bypass diverting the refrigerant that flows at least partially around the electric motor and/or at least the power components of power electronics controlling the electric motor so as to release the absorbed heat generated by the power dissipation of the electric motor and/or the power components to the interior of the vehicle.

The advantage of the invention consists in that the additional heating is achieved by using the compressor/motor unit present in the vehicle. Only a few additional devices have to be installed. The additional heating system according to the invention thus requires no additional installation space in the motor vehicle.

The heating bypass advantageously has a feed duct which carries the refrigerant from an evaporator to a housing containing the electric motor and the compressor, the switching device arranged on the housing being connected to the evaporator by a return duct.

The refrigerant supplied with the waste heat is passed to the evaporator, which heats up the air flowing past, which is directed into the interior of the vehicle. With the use of higher vehicle-system voltages in motor vehicles, air-conditioning compressors that are driven by electric motors and provided with control electronics will soon be standard equipment in vehicles. The only structural measure that has to be taken is to ensure that the output from the compressor is diverted to the evaporator.

In a development of the invention, the electric motor and the compressor are arranged in the housing carrying the power electronics, the refrigerant emerging from the evaporator flowing around the electric motor and/or at least the power components of the engine control electronics before entering the compressor. This has the advantage that the electric motor is cooled by the refrigerant, which is subject to forced circulation.

In a refinement, the refrigerant flows around the electric motor on all sides. Particularly when the electric motor is arranged within a container holding the refrigerant, the heat exchange area that can be achieved between the electric motor and the refrigerant can be considerably increased, it being possible for the heat that arises to be released directly from the electric motor to the refrigerant via its housing. At the same time, the refrigerant surrounding the electric motor acts as a sound absorber, thus significantly reducing the noise that gets through to the outside.

Advantageously at least the power components of the power electronics are arranged in close thermal contact with the refrigerant.

The power components are thus embodied in such a way that they can be cooled by means of a heat exchange surface wetted by the refrigerant. The power electronics are prevented from heating up to an impermissibly high level associated with possible damage to the electronics by the fact that the engine and electronics are cooled by the refrigerant when they reach their limit temperatures. This means that even powerful electric motors that develop a large amount of heat can be used.

In a particularly advantageous development of the invention, the heat exchange surface is embodied as part of the electric motor. In this arrangement, the heat exchange surface comprises a multiplicity of ducts, through which the refrigerant flows, thereby increasing the effective surface area for heat exchange. As a result, the heat can be dissipated by the refrigerant directly in the area in which it arises at the electric motor. The inflow to the heat exchange surface ensures almost complete wetting, and, in particular, it is possible to avoid the formation of stagnation zones or regions of reduced flow velocity, and heat transfer can be improved. As a result, it is possible to achieve further enhanced heat dissipation while simultaneously increasing efficiency.

In a refinement, the power electronics containing the power components are arranged on a thick-film ceramic substrate which is bonded onto the surface of the container by means of a thermally conductive adhesive.

As an alternative, the power electronics containing the power components are arranged on thermally conductive ceramic which is coated on both sides with copper and is soldered onto the heat exchange surface.

In particular, such substrates provide vibration-resistant arrangement of the power electronics in the motor vehicle.

The power electronics advantageously drive the switching device to switch over from the refrigerating circuit to the heating bypass and vice versa. As an alternative, the power electronics are connected to the air-conditioning control unit of the heating/air-conditioning unit, the air-conditioning control unit driving the power electronics to switch the refrigerating circuit over to the heating bypass and vice versa.

In a refinement, the air-conditioning control unit or the power electronics control(s) the electric motor for additional heating as required. If the refrigerant is to be used for its original purpose in the refrigerating circuit to cool the interior of the vehicle, it is passed from the evaporator via the compressor to a condenser and to the throttle and back again to the evaporator. However, if the refrigerant is to be used for additional heating, the refrigerant flowing through the electric motor and the compressor is fed back directly to the evaporator.

When a need is detected, the air-conditioning control unit drives the switching device automatically.

To prevent the engine temperature or the temperature occurring at the power electronics from exceeding a critical limiting value, respective temperature sensors for monitoring these temperatures are integrated into the housing and connected to the air-conditioning control unit and the power electronics to protect the electric motor and the output stages in critical situations.

On the basis of evaluation of the signals supplied by the temperature sensors, the air-conditioning control unit or the power electronics changes or change a control frequency so as to operate the electric motor at an operating point at which a high level of power dissipation can be produced. To increase the heat output, the efficiency of the motor is thus deliberately reduced.

The mechanical power dissipation of the drive unit (e.g. frictional losses of the bearings, compression power) also contributes to an increase in the temperature of the refrigerant.

In a simple embodiment of the invention, the switching device is designed as a valve.

BRIEF DESCRIPTION OF THE DRAWINGS

The invention allows numerous exemplary embodiments. One of these will be explained in greater detail with reference to the figures illustrated in the drawings, in which:

FIG. 5 shows the arrangement of the engine control electronics on the housing.

DETAILED DESCRIPTION OF THE PREFERRED EMBODIMENTS

Figure 1:
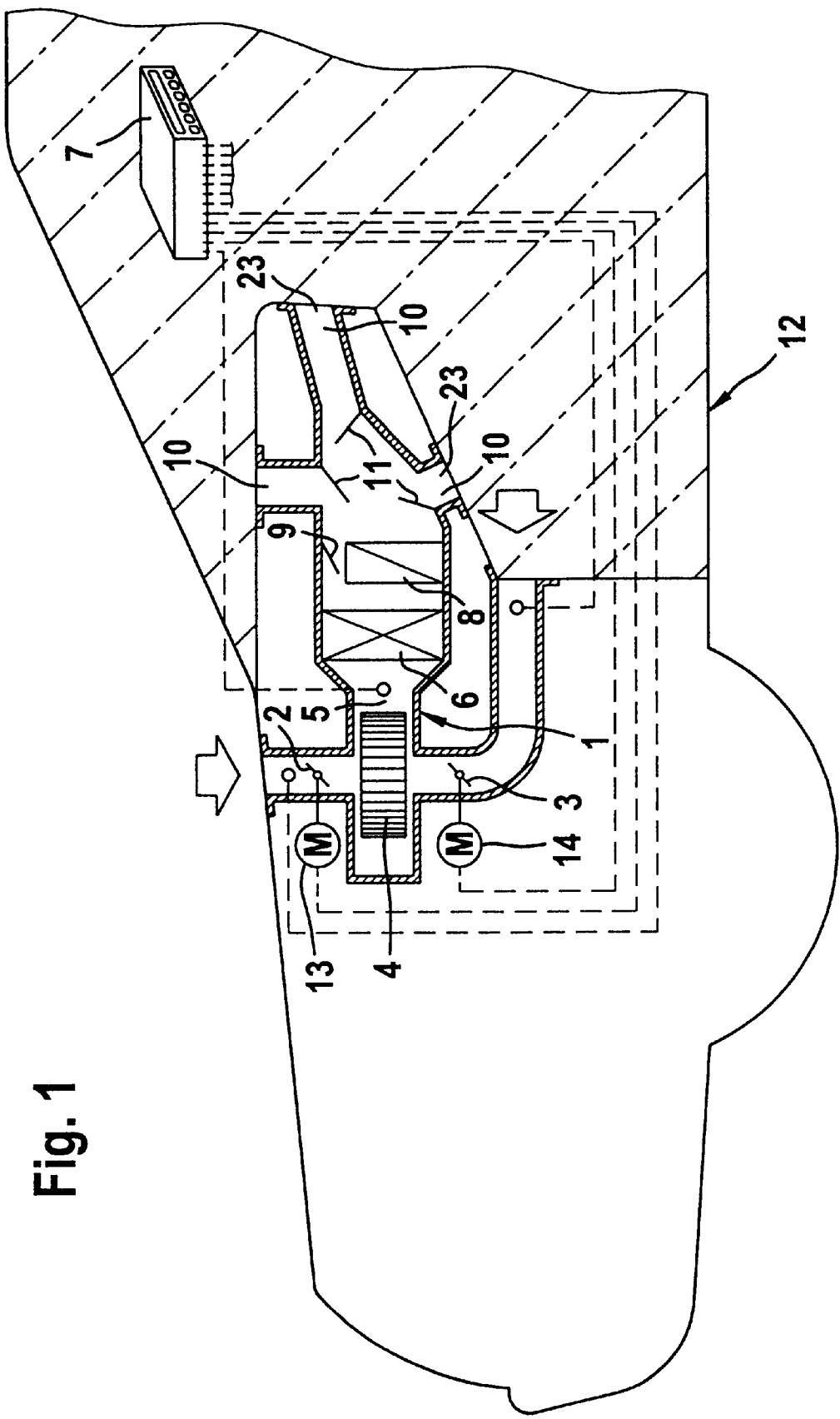
FIG. 1 shows the arrangement of the heating/air-conditioning unit in the motor vehicle.

Identical features are indicated by the same reference numerals.

In FIG. 1, the air-conditioning unit 1 is shown in the way it would actually be arranged in the motor vehicle 12. Fresh air is drawn into the vehicle 12 from the surroundings of the motor vehicle via the fresh-air valve 2, the position of which is controlled by a positioning motor 13 as a function of electrical signals produced by the air-conditioning control unit 7.

The recirculated air from the passenger compartment of the motor vehicle is drawn in by the air-conditioning unit 1 via the recirculation valve 3. The position of the recirculated-air valve 3 is likewise controlled by a positioning motor 13 as a function of electrical signals from the air-conditioning control unit 7. The recirculated air and the fresh air are pumped into the air-conditioning unit by the fan 4, giving rise downstream of the fan 4 to mixed air 5, which is fed to the refrigerating heat exchanger 6.

In cooling mode, the mixed air 5 is discharged into the passenger compartment via vents 10. These vents 10 are arranged in ducts 23, which point in the direction of the windshield, the driver and front-seat passenger and the driver and front-seat passenger's feet. The inflow of air can be controlled by the driver or front-seat passenger by means of the air distribution flaps 11 arranged in the individual ducts 23.

Adjoining the refrigerating heat exchanger 6 is a heating heat exchanger 8. The quantity of air discharged by the refrigerating heat exchanger 6 is guided past the heating heat exchanger 8 with the aid of a temperature flap 9 and heated in the process. In heating mode, the appropriately temperature-regulated mixed air then flows into the passenger compartment.

Figure 2:
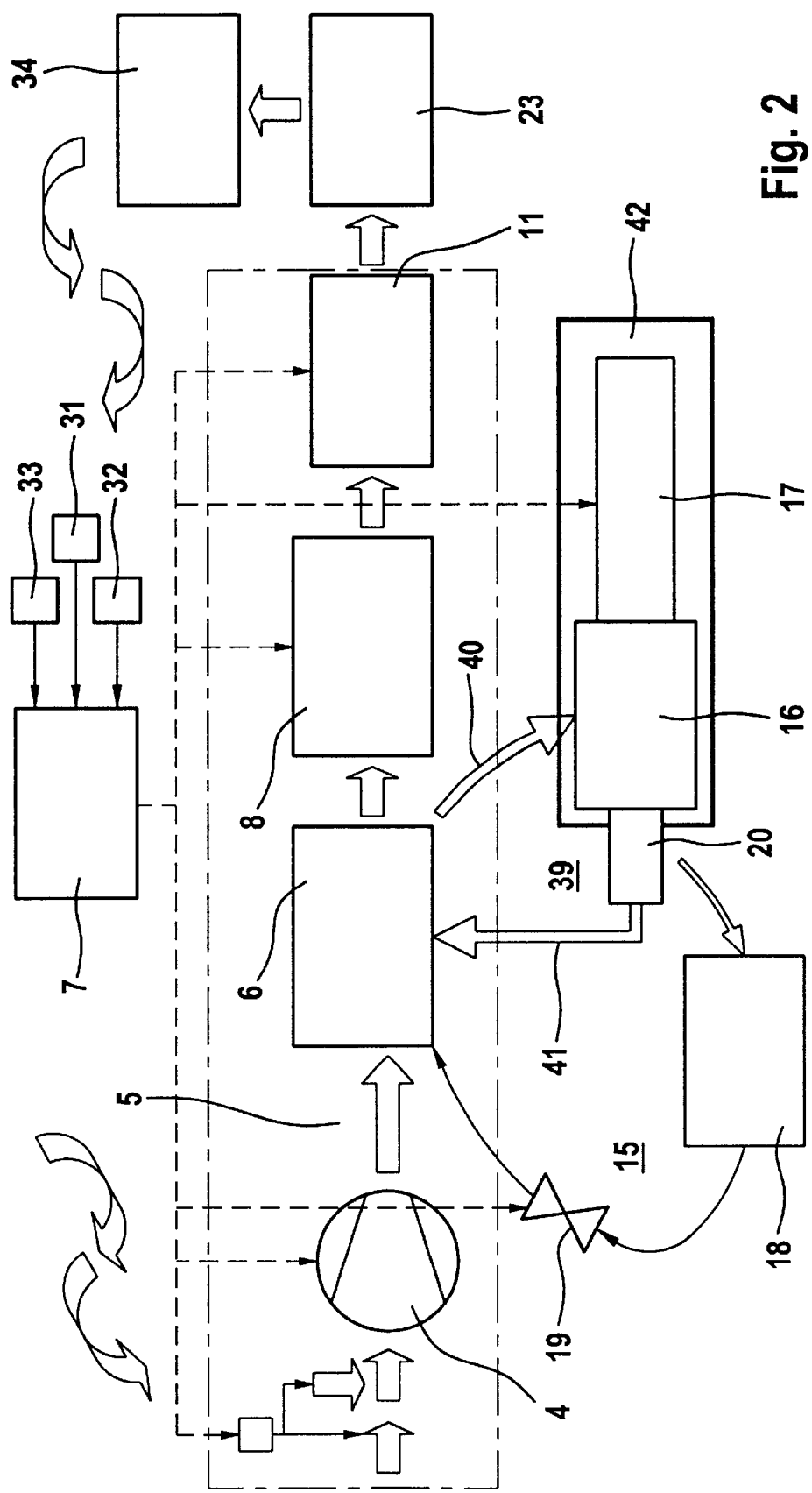
FIG. 2 shows the refrigerant circuit as an additional heating system.

FIG. 2 shows the motor vehicle's cooling circuit described in an air-conditioning unit of this kind. As already explained, the mixed air 5 available downstream of the fan 4 is fed to the evaporator 6. In the cooling mode of the heating/air-conditioning unit 1, this evaporator 6 is cooled by means of a refrigerant circuit 15, ensuring that the air emerging into the passenger compartment is at the temperature desired by the driver.

The evaporator 6 is cooled by means of a refrigerant, which is recirculated in the refrigerant circuit 15 in inlet and delivery lines indicated only by arrows.

In the evaporator 6, the refrigerant evaporates and is then drawn in and compressed by the compressor 16. After this, the refrigerant is cooled and condensed in a condenser 18, and the liquid refrigerant is then expanded by means of an expansion unit 19 and fed back to the evaporator 6 as saturated vapor.

The compressor 16 forms a constructional unit with a speed-regulated electric motor 17 and the engine control electronics 29. The compressor 16 and the electric motor 17 are advantageously arranged in a common metal housing 24.

To allow the compressor 16 driven by the electric motor 17 to be used as an additional heater, there is a switching valve 20, which is controlled by the air-conditioning control unit 7 and, when the refrigerant is to be used for additional heating, passes the latter back from the compressor 16 to the evaporator 6 via a return duct 41 in a bypass 39, and, in the evaporator, the dissipated energy absorbed by the refrigerant is released to the air to be heated. The switching valve 20 is advantageously designed as a rotary slide valve. As an alternative, however, it is also possible to use a 3/2-way valve as the switching valve 20.

Figure 3:
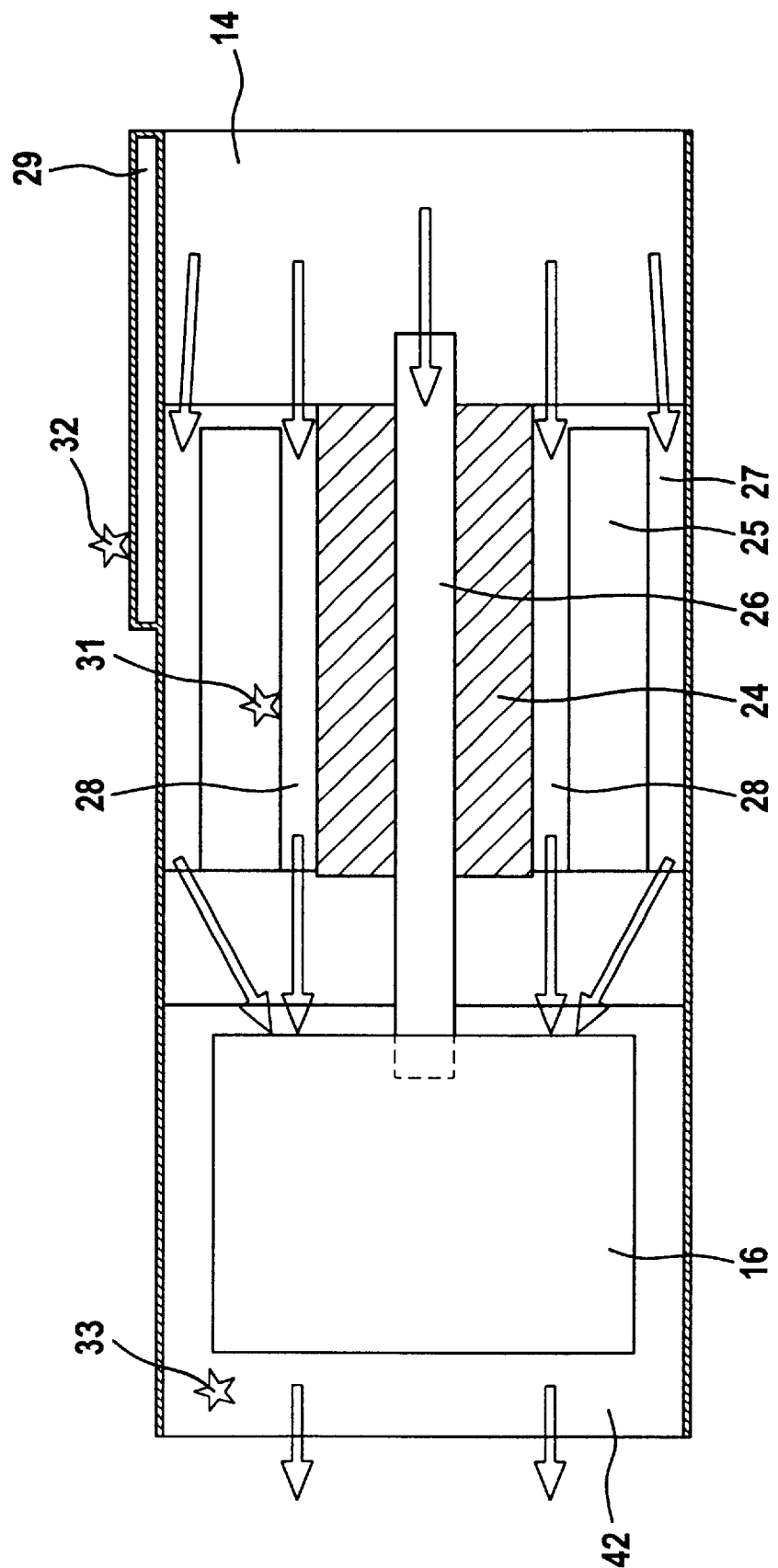
FIG. 3 shows a first embodiment of the compressor, which is driven by an electric motor.

FIG. 3 shows a constructional unit comprising compressor 16, electric motor 17 and the power electronics 29. Here, the electric motor 17 comprises a rotor 24, a stator 25 and a shaft 26, which are surrounded by a motor housing 27. The refrigerant coming from the evaporator 6 flows via ducts 28 through the gap between the rotor 24 and the stator 25. The shaft 26 can be embodied as a hollow shaft. These ducts 28 are formed on the outside of the housing 27 of the motor 17. However, they can also be formed in the motor housing 27 itself, ensuring that the refrigerant flowing around this motor 17 flows as close as possible to the heat-generating parts of the electric motor 17.

From the evaporator 6, the refrigerant flows via a connecting duct 40 into the interior 14 of the housing 42 in which the electric motor 17 is arranged and flows through the ducts 28. In this way, the waste heat given off by the electric motor 17 is absorbed by the refrigerant. The refrigerant heated in this way passes from the interior of the housing into the compressor 16, where it is conveyed onward accordingly.

Figure 4:
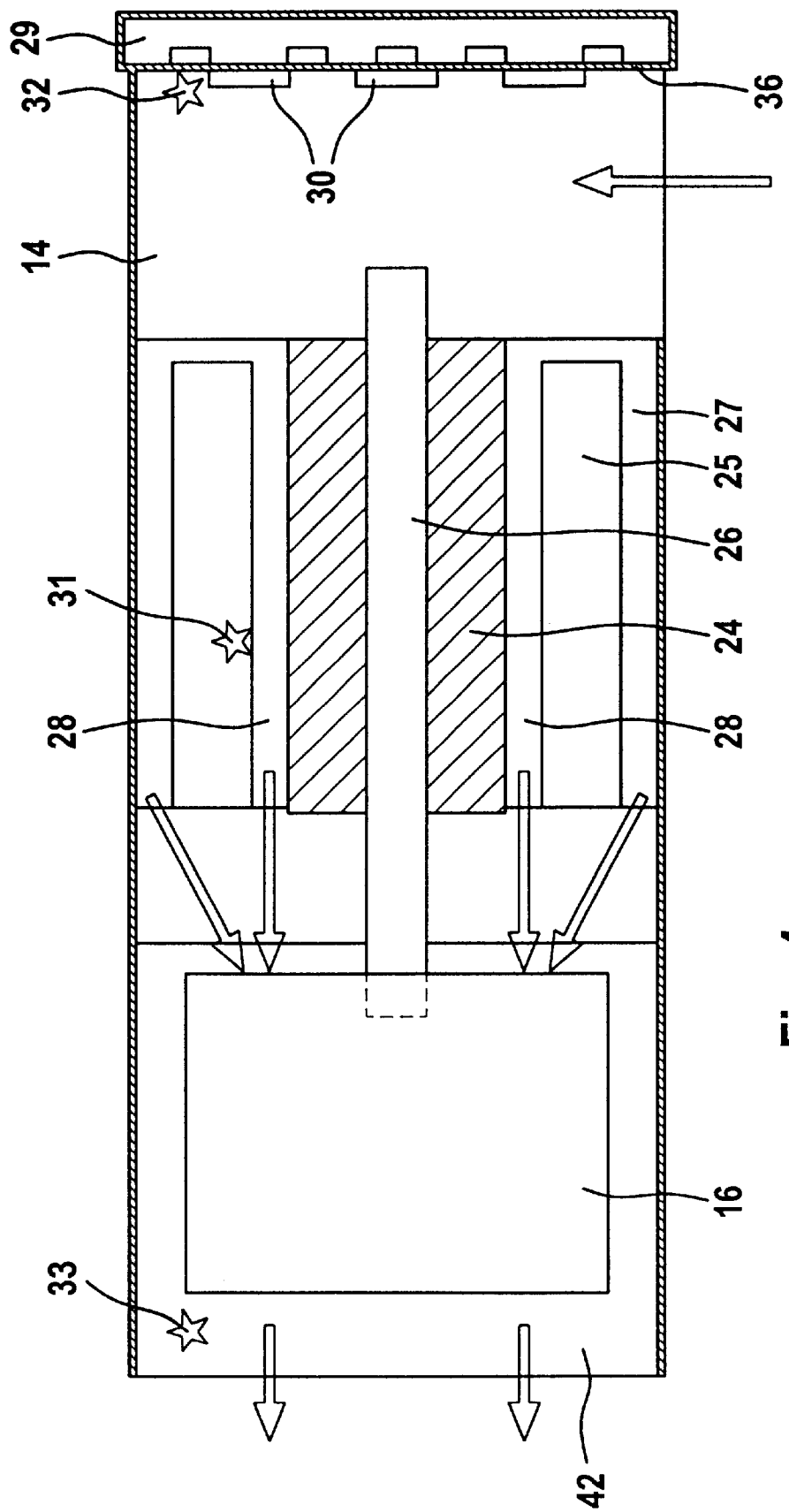
FIG. 4 shows a second embodiment of the compressor, which is driven by an electric motor.

In this arrangement, the electronics 29 containing the power components 30 for the electric motor 17 rest against the outer wall of the container 42. However, as illustrated in FIG. 4, it is also possible for the electrically insulated components 30 to be within the container 24. In this context, the power components 30 can also project into the housing interior 14 and be wetted directly by the refrigerant.

To determine the temperature of the electric motor 17 and of the power semiconductors 30, there are respective temperature sensors 31, 32 provided, which are connected to the air-conditioning control unit 7 or the power electronics 29. The temperature sensors are generally designed as thermistors with a positive or negative temperature coefficient. The control unit 7 or the power electronics 29 perform an automatic cut-off when a maximum permissible temperature at the electric motor 17 or power electronics is reached.

The heat output desired is regulated by increasing the electric power dissipation and selective adjustment of the volume flow of the refrigerant. For this purpose, the compressor 16 is adjusted accordingly by means of the speed-regulated electric motor 17. Speed regulation is carried out by the air-conditioning control unit 7. For this purpose, the air-conditioning control unit 7 controls the electric motor 17 with a corresponding pulse-width-modulated voltage signal. Varying the pulse width of the control signal is a simple means of achieving differences in the power and hence heat generation of the electric motor.

Thus, for example, more rapid heating is possible by increasing the control frequency of the electric motor 17 in order to make the electric motor 17 release more heat.

Using the additional heating system leads to a reduction in the length of the cold-starting phase of the internal combustion engine.

FIG. 5 shows two variants of the arrangement of the power electronics 29 on the housing wall 36 of the container 42. According to Figure a), a thick-film technique is used to arrange the electrical components on a ceramic substrate 37 secured flat on the housing wall 36 by means of a thermally conductive adhesive 35. In Figure b), copper plates, to which the electrical components are soldered, are welded as conductor tracks onto a ceramic substrate 38 of good thermal conductivity. Here too, the substrate 38 is soldered flat onto the housing wall 36 to ensure good thermal coupling with the latter.

What is claimed is:

1. An additional heating system for a motor vehicle comprising:
    a heating/air-conditioning unit (1) of the motor vehicle comprising a compressor (16) driven by an electric motor (17) and arranged in a refrigerating circuit (18) carrying a refrigerant;
    wherein the compressor (16) comprises a switching device (20) for switching from the refrigerating circuit (18) to a heating bypass (39) and back again; and
    wherein the heating bypass (39) diverts the refrigerant that flows at least partially around the electric motor (17) and/or at least the power components (30) of power electronics (29) controlling the electric motor (17) so as to release the absorbed heat generated by the power dissipation of the electric motor (17) and/or the power components (30) to the interior (34) of the vehicle.

2. A device as claimed in claim 1, wherein the heating bypass (39) comprises a feed duct (40) which carries the refrigerant from an evaporator (6) to a housing (42) containing the electric motor (17) and the compressor (16), and wherein the switching device (20) arranged on the housing (42) is connected to the evaporator (6) by a return duct (41).

3. The device as claimed in claim 2, wherein the electric motor (17) and the compressor (16) are arranged in the housing (42) carrying the power electronics (29), and wherein the refrigerant emerging from the evaporator (6) flows around the electric motor (17) and/or at least the power components (30) of the power electronics (29) before entering the compressor (16).

4. The device as claimed in claim 3, wherein the refrigerant flows around the electric motor (17) on all sides.

5. The device as claimed in claim 3, wherein the power components (30) are arranged in close thermal contact with the refrigerant.

6. The device as claimed in claim 4, wherein the power electronics (30) are arranged in or on the housing (42).

7. The device as claimed in claim 5, wherein the power components (30) are constructed in such a way that they can be cooled by means of a heat exchange surface (36) wetted by the refrigerant.

8. The device as claimed in claim 7, wherein the heat exchange surface (36) has a multiplicity of ducts (28), through which the refrigerant flows.

9. The device as claimed in claim 1, wherein the power electronics (29) containing the power components (30) are arranged on a thick-film ceramic substrate (37) which is bonded onto the surface (36) of the container (42).

10. The device as claimed in claim 9, wherein the power electronics (29) containing the power components (30) are arranged on thermally conductive ceramic (38) which is provided on both sides with copper and is seated on the heat exchange surface (36).

11. The device as claimed in claim 1, wherein the power electronics (29) drive the switching device (20) to switch the refrigerating circuit (18) over to the heating bypass (39) and vice versa.

12. The device as claimed in claim 11, wherein the power electronics (29) are connected to the air-conditioning control unit (7) of the heating/air-conditioning unit (1), the air-conditioning control unit (7) driving the power electronics (30) to switch the refrigerating circuit (18) over to the heating bypass (39) and vice versa.

13. The device as claimed in claim 11, wherein the air-conditioning control unit (7) or the power electronics (29) control(s) the electric motor (17) for additional heating as required.

14. The device as claimed in claim 11, wherein the air-conditioning control unit (7) drives the switching device (20) automatically after detecting the heating situation.

15. The device as claimed in claim 14, further comprising a temperature sensor (31) for monitoring the temperature of the electric motor (17) and a temperature sensor (32) for monitoring the temperature of the power electronics (29) integrated into the housing (42) and connected to the air-conditioning control unit (7).

16. The device as claimed in claim 15, wherein, on the basis of evaluation of the signals supplied by the temperature sensors (31, 32), the air-conditioning control unit (7) or the power electronics (30) changes or change a control frequency so as to operate the electric motor (17) at an operating point at which a high level of power dissipation can be produced.

17. The device as claimed in claim 1, wherein the switching device (20) is designed as a valve.

* * * * *